US008025603B2

(12) United States Patent
Hemphill

(10) Patent No.: US 8,025,603 B2
(45) Date of Patent: Sep. 27, 2011

(54) DUAL TORQUE PATH TRANSMISSION WITH SWITCHABLE RADIALLY DISPLACING ONE-WAY CLUTCH AND FLUID COUPLING BRAKE

(75) Inventor: Jeffrey Hemphill, Copley, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 400 days.

(21) Appl. No.: 11/893,539

(22) Filed: Aug. 15, 2007

(65) Prior Publication Data
US 2008/0045370 A1   Feb. 21, 2008

Related U.S. Application Data

(60) Provisional application No. 60/838,764, filed on Aug. 18, 2006.

(51) Int. Cl.
*F16H 3/62* (2006.01)
*F16H 37/06* (2006.01)

(52) U.S. Cl. ............... 475/276; 475/329; 475/330

(58) Field of Classification Search ............... 475/276, 475/221, 332, 330, 329; 74/665 R
See application file for complete search history.

(56) References Cited

U.S. PATENT DOCUMENTS

| | | | | |
|---|---|---|---|---|
| 2,799,184 A | * | 7/1957 | Miller | 475/280 |
| 3,282,131 A | * | 11/1966 | Smith | 475/276 |
| 3,620,323 A | * | 11/1971 | Maeda et al. | 180/65.25 |
| 3,623,568 A | * | 11/1971 | Mori | 180/15 |
| 3,667,321 A | * | 6/1972 | Maurice | 475/81 |
| 4,357,840 A | * | 11/1982 | Winzeler | 475/205 |
| 4,468,980 A | * | 9/1984 | Johansen | 475/59 |
| 6,090,005 A | * | 7/2000 | Schmidt et al. | 475/5 |
| 6,402,654 B1 | * | 6/2002 | Lanzon et al. | 475/204 |
| 6,409,001 B1 | | 6/2002 | Kerr | |
| 6,669,596 B1 | * | 12/2003 | Sefcik | 475/278 |
| 6,837,823 B2 | | 1/2005 | Lee et al. | |
| 7,004,881 B2 | | 2/2006 | Haka | |
| 7,238,140 B2 | * | 7/2007 | Gradu | 475/221 |
| 7,261,665 B2 | * | 8/2007 | Friedmann et al. | 475/275 |
| 7,537,539 B2 | * | 5/2009 | Antonov et al. | 475/218 |
| 7,566,286 B2 | * | 7/2009 | Hemphill et al. | 475/303 |

FOREIGN PATENT DOCUMENTS
WO   WO 2005050060 A1 *  6/2005

* cited by examiner

*Primary Examiner* — Tisha Lewis
(74) *Attorney, Agent, or Firm* — Simpson & Simpson, PLLC

(57) ABSTRACT

The present invention broadly comprises a transmission for a vehicle, including two dual planetary gearsets arranged to transmit torque, independent of each other, from an input shaft for the transmission to an output for the transmission. In a gear for the transmission, one of the dual gearsets is arranged to transmit the torque to the output and the other of the dual gearsets is arranged to be ungrounded. The transmission includes first and second brakes arranged to ground a respective portion of the dual planetary gearsets. In some aspects, the dual planetary gearsets each include a planetary gearset connected to a respective brake and the output, and switches arranged to control the connection of the gearsets to the first and second brakes. In some aspects, the dual gearsets each include a planetary gearset connectable to the input shaft and switching assemblies for the planetary gearsets.

9 Claims, 9 Drawing Sheets

DUAL TORQUE PATH TRANSMISSION WITH SWITCHABLE RADIALLY DISPLACING ONE-WAY CLUTCH AND FLUID COUPLING BRAKE

CROSS-REFERENCE TO RELATED APPLICATIONS

This patent application claims the benefit under 35 U.S.C. §119(e) of U.S. Provisional Application No. 60/838,764, filed Aug. 18, 2006, which application is incorporated herein by reference.

FIELD OF THE INVENTION

The invention relates to improvements to a rotary driven unit (such as the variable-speed transmission in the motor vehicle). In particular, the invention relates to a dual torque path transmission using two dual planetary gearsets and two brakes. The invention also relates to a switchable radially displacing one-way clutch activated by hydraulic pressure. Still further, the invention relates to a brake combining a fluid coupling and a lock-up clutch to minimize shudder.

BACKGROUND OF THE INVENTION

The automotive market recognizes the need to develop and produce cost-effective automotive transmissions with improved fuel efficiency and adequate launch performance. Also, to optimize shifting in a transmission, it is recognized that it is desirable to isolate launch and target gears during a gear shift. Constant Velocity Transmissions are known. Unfortunately, these transmission tend to be expensive. Transmissions with dual power inputs for odd and even gears are known. Some of these dual input transmission use manual transmission components. Unfortunately, the North American automotive market is dominated by automatic transmission and automatic transmission components, such as planetary gearsets, and it may be cost prohibitive to enact the production conversion needed to produce manual transmission components in sufficient quantities for dual input transmissions.

It is known to use planetary gearsets in a dual power input transmission. For example, U.S. Pat. Nos. 6,837,823 and 7,004,881 describe respective transmissions having a dual planetary gearset. Unfortunately, in both patents, the output of the transmission is connected only to a single planetary gearset in the dual planetary gearset, thus precluding the ability to isolate the launch and target gear or to have separate torque paths.

Switchable, one-way clutches are known, for example, as described in U.S. Pat. No. 6,409,001. Unfortunately, such clutches rely on extra mechanical components, such as pins, to implement the switching and locking functions.

Wet clutches are used in various torque transmittal applications, for example, in brakes to ground a planetary gearset in a transmission. For wet clutches, the characteristics of the fluid in the system affect the operation of the clutch, in particular, the friction coefficient. It is desirable to maintain a positive friction gradient during the operation of a clutch to prevent shuddering as the clutch closes. That is, the friction coefficient should decrease as slip speed decreases toward zero. Unfortunately, degradation of the fluid results in an undesirable negative friction gradient, that is, an increase in the friction coefficient as slip speed decreases toward zero, and subsequent shuddering during the closing of the brake. Replacing the fluid at more frequent intervals is not an attractive option due to the time and cost involved and the inconvenience to the user of the device housing the clutch, for example a vehicle with a transmission housing the clutch.

Thus, there is a long-felt need for a cost-effective dual torque path transmission using automatic transmission components such as planetary gearsets. There also is a long-felt need for a simpler switchable, one-way clutch controllable using elements already present in an application, for example, a transmission. Further, there is a long-felt need for a wet clutch able to minimize the impact of undesired changes in friction gradient.

BRIEF SUMMARY OF THE INVENTION

The present invention broadly comprises a transmission for a vehicle, including a first dual planetary gearset and a second dual planetary gearset. The first and second dual planetary gearsets are arranged to transmit torque, independent of each other, from an input shaft for the transmission to an output for the transmission. In a gear for the transmission, one of the first and second dual gearsets is arranged to transmit the torque to the output and the other of the first and second dual gearsets is arranged to be ungrounded. The transmission includes first and second brakes arranged to ground a respective portion of the first and second dual planetary gearsets, respectively.

In some aspects, the first and second dual planetary gearsets include first and second planetary gearsets, respectively, connected to the first and second brakes, respectively. In some aspects, the transmission includes first and second switches arranged to control the connection of the first and second planetary gearsets and the first and second brakes, respectively. In some aspects, the first switch is arranged to connect a sun for the first planetary gearset to the first brake in a first position and to connect a carrier for the first planetary gearset in a second position and the second switch is arranged to connect a sun for the second planetary gearset to the second brake in a third position and to connect a carrier for the second planetary gearset in a fourth position. In some aspects, the first and second switches include at least one first and second one-way clutch, respectively. In some aspects, the first and second planetary gearsets are connected to the output.

In some aspects, the first and second dual planetary gearsets include third and fourth planetary gearsets, respectively, connectable to the input shaft. In some aspects, the transmission includes third and fourth switching assemblies arranged to control connection of the third and fourth planetary gearsets, respectively, to the input shaft. In some aspects, in first and second positions for the third switching assembly, a sun and a ring, respectively, for the third planetary gearset are arranged to connect to the input shaft and in first and second positions for the fourth switching assembly, a sun and a ring, respectively, for the fourth planetary gearset are arranged to connect to the input shaft. In some aspects, the third and fourth switching assemblies include at least one third and fourth one-way clutch, respectively. In some aspects, the third and fourth planetary gearsets are connected to the output.

The present invention also broadly comprises a transmission for a vehicle, including a first dual planetary gearset and a second dual planetary gearset. The first and second dual planetary gearsets are each separately connected to a single output for the transmission.

The present invention further broadly comprises a transmission for a vehicle, including first and second separate torque paths connected to a single output for the transmission and first and second brakes connected to the first and second torque paths. The first and second brakes are arranged to switch torque from an input shaft for the transmission between the first and second torque paths. In some aspects, the transmission includes first and second double planetary gearsets disposed in the first and second torque paths, respectively.

The present invention broadly comprises a one-way clutch, including an inner ring and an outer ring. One of the inner and outer rings is arranged to radially displace to rotationally lock with the other of the inner and outer rings. In some aspects, the one of the inner and outer rings is arranged to radially displace in response to hydraulic pressure. The radial displacement enables differential rotation between the inner and outer rings. In some aspects, the clutch includes a plurality of rollers disposed between the inner and outer rings and in response to the radial displacement, the rollers are arranged to displace to rotationally lock the inner and outer rings. In some aspects, the radial displacement is arranged to cause differential rotation between the inner and outer rings and the rollers are arranged to displace responsive to the differential rotation.

In some aspects, the inner and outer rings include outer and inner circumferential surfaces, respectively, the inner and outer surfaces include respective pluralities of ramps, and the rollers displace with respect to the pluralities of ramps responsive to the second differential rotation. In some aspects, the other of the inner and outer rings is arranged to rotationally connect to a torque transmitting element. Prior to the radial displacement, the one of the inner and outer rings is arranged to slidingly engage a torque receiving element and the torque receiving element is torsionally isolated the torque transmitting element. In response to the radial displacement, the one of the inner and outer rings is arranged to rotationally connect to the torque receiving element and the clutch is arranged to transmit the torque from the torque transmitting element to the torque receiving element. The rotational connection to the torque receiving element enables a third differential rotation between the inner and outer rings.

In some aspects, the inner and outer rings are arranged to rotate in a first direction or the inner and outer rings are arranged to rotate in a second direction, opposite the first direction. In some aspects, the one of the inner and outer rings is the inner ring and the radial displacement is radially inward. In some aspects, the one of the inner and outer rings is the outer ring and the radial displacement is radially outward.

The present invention also broadly comprises a one-way clutch, including an inner ring having an outer circumferential surface with a first plurality of ramps and arranged to connect to a torque transmitting element; an outer ring with an inner circumferential surface having a second plurality of ramps and arranged to radially expand in response to hydraulic pressure to engage a torque receiving element and to differentially rotate with respect to the inner ring in response to the radial expansion; and a plurality of rollers disposed between the inner and outer rings and arranged to displace along the first and second pluralities of ramps in response to the differential rotation to rotationally lock the inner and outer rings.

The present invention further broadly comprises a brake, including a fluid coupling having first and second housings with first and second pluralities of blades, respectively and a first wet launch clutch. The second housing is arranged to axially displace toward the first housing to close the brake. The axial displacement generates a clamping force to close the first clutch. In some aspects, the brake includes an axis of rotation and the first clutch is disposed radially closer to the axis of rotation with respect to the coupling. In some aspects, the brake includes a second wet launch clutch disposed radially further from the axis of rotation with respect to the coupling.

In some aspects, the first housing is arranged for connection to a ground and the second housing is arranged for connection to an element rotatable with respect to the ground. In some aspects, the rotatable element is arranged to transmit torque and during a launch event, the fluid coupling is arranged to carry substantially all of the torque and a portion of the torque transmitted by the coupling is proportional to an axial distance between the first and second housings. In some aspects, during a launch event, the coupling is arranged to positively counteract a negative friction gradient associated with the clutch. The brake includes oil and in some aspects, the negative friction gradient is associated with degradation of the oil. The brake includes an actuator arranged to displace the second housing. In some aspects, the actuator is an electric motor.

The present invention broadly comprises a brake, including a fluid coupling with a first grounded housing and a second housing axially displaceable with respect to the first housing and a wet launch clutch The brake is arranged for connection to a rotatable device transmitting a torque, during a launch event, the fluid coupling is arranged to carry substantially all of the torque and a portion of the torque transmitted by the coupling is proportional to an axial distance between the first and second housings, and the fluid coupling generates a clamping force for the clutch.

It is a general object of the present invention to provide a cost-effective dual torque path transmission using planetary gearsets.

It is another object of the present invention to provide an automatic transmission providing separate torque paths for even and odd gears using planetary gear sets and brakes.

It is yet another object of the present invention to provide a switchable one-way clutch controllable by fluid pressure.

It is a further object of the present invention to provide a one-way clutch lockable in response to differential rotation between rings for the clutch.

It is a still further object of the present invention to provide a brake including a fluid coupling and a lock-up clutch to offset friction characteristics associated with degraded oil.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
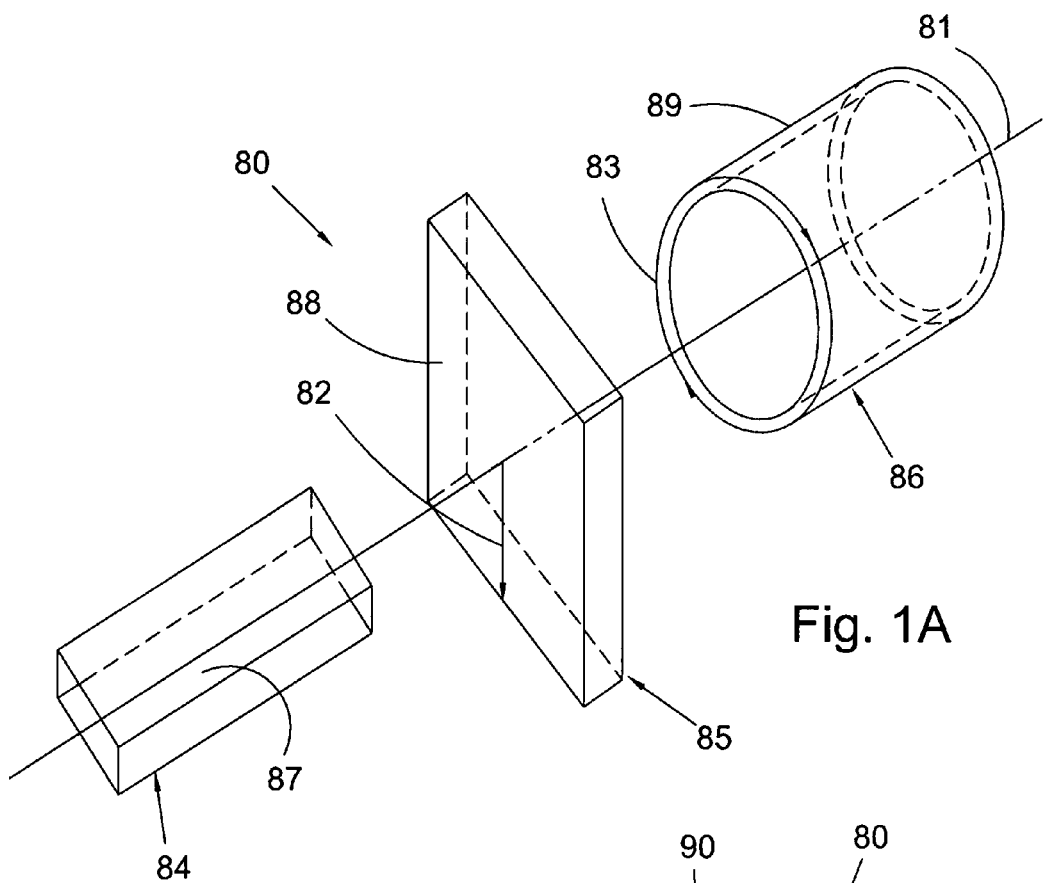
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
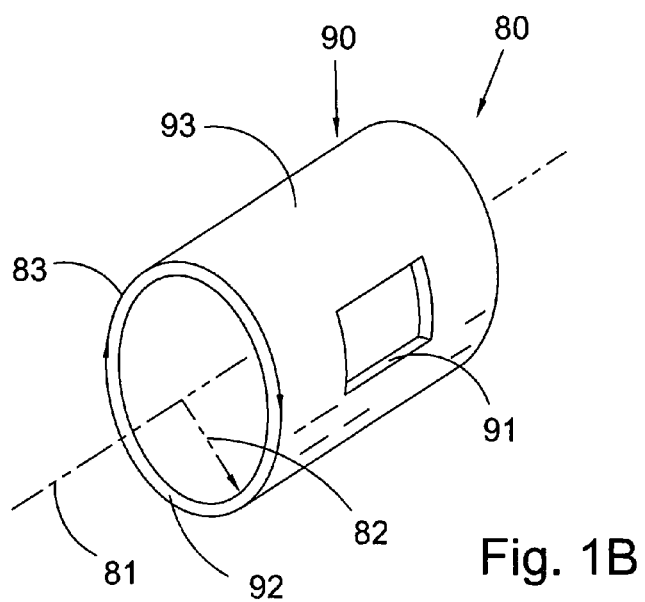
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
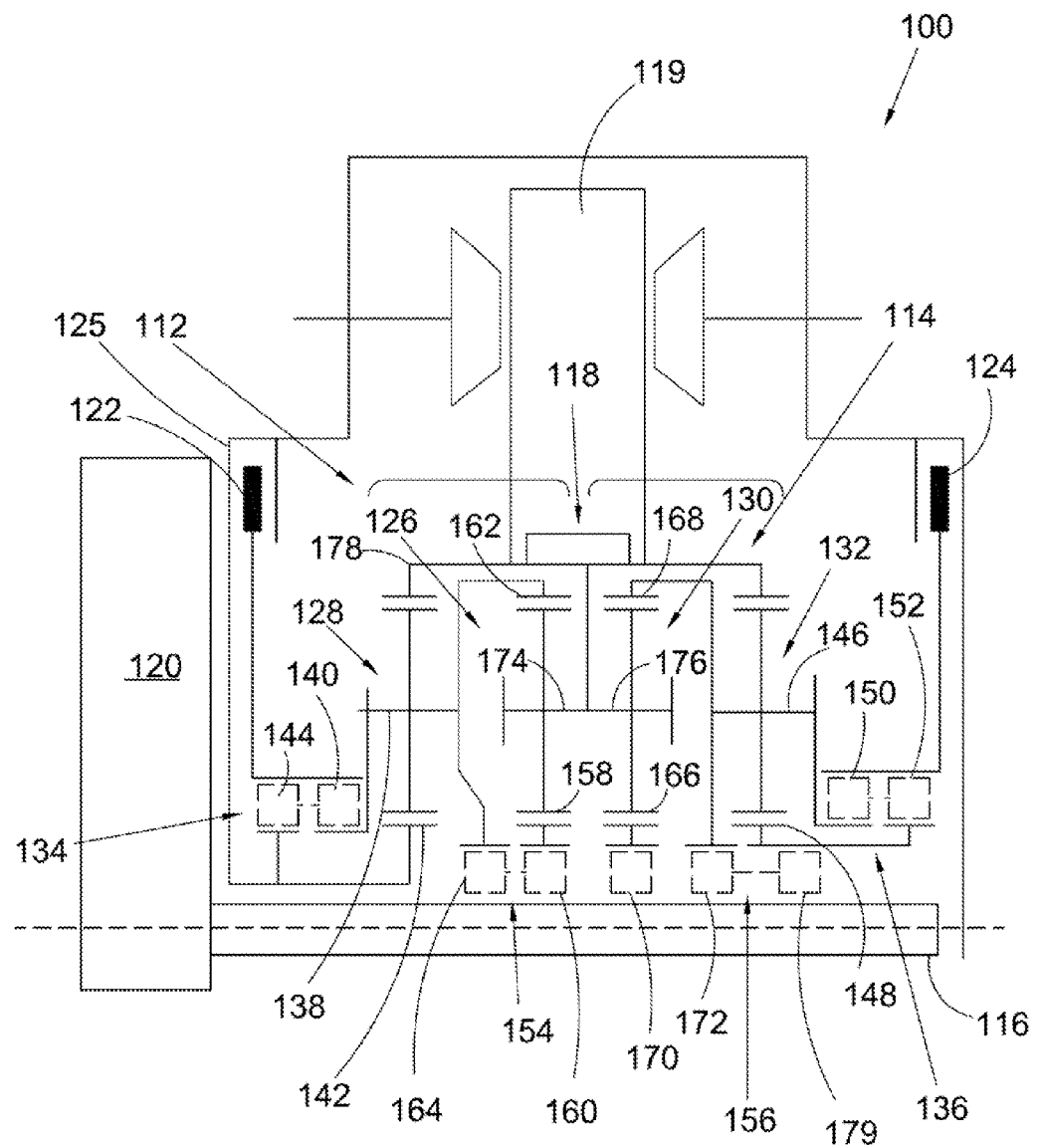
FIG. 2 is a stick diagram of a present invention transmission.

FIG. 2 is a stick diagram of present invention transmission 100. Transmission 100 includes dual planetary gearsets 112 and 114 arranged to transmit torque, independent of each other, from input shaft 116 to output 118 for the transmission. In FIG. 2, the output is connected to differential 119 for a front wheel drive. However, it should be understood that transmission 100 also can be used with a rear wheel drive. As further described below, transmission 100 has two separate, or independent, torque paths between the input shaft and the output. For example, gearsets 112 and 114 are each connected to the input and output independent of the other. Therefore, for a particular gear in the transmission, one of gearsets 112 and 114 is arranged to transmit torque and the other gearset is arranged to free of the torque. Shaft 116 is connected to engine 120 for a vehicle (not shown). Transmission 100 also includes brakes 122 and 124 arranged to ground a respective component of dual planetary gearsets 112 and 114, respectively, to transmission casing 125. Gearsets 112 and 114 are arranged to transmit torque responsive to the grounding of the respective components as described below.

Dual planetary gearset 112 includes planetary gearsets 126 and 128 and dual gearset 114 includes planetary gearsets 130 and 132. Gearsets 128 and 132 are connected to brakes 122 and 124, respectively. Transmission 100 also includes switches 134 and 136 arranged to control the connection of gearsets 128 and 132 to brakes 122 and 124, respectively. Switch 134 is arranged to connect carrier 138 for gearset 128 to brake 122 in position 140 and to connect sun 142 for gearset 128 to brake 122 in position 144. In like fashion, switch 136 is arranged to connect carrier 146 and sun 148 for gearset 132 to brake 124 in positions 150 and 152, respectively.

Gearsets 126 and 130 are controllably connectable to the input shaft. Transmission 100 includes switches 154 and 156 arranged to control the connection of gearset 126 and 130 to the input shaft. Switch 154 is arranged to connect sun 158 for gearset 126 to the shaft in position 160 and to connect ring 162 for gearset 126 to the shaft in position 164. In like fashion, switch 156 is arranged to connect sun 166 and ring 168 for gearset 130 to the shaft in positions 170 and 172, respectively.

For first gear, switch 154 selects position 160, switch 134 selects position 140, and brake 124 is open. Since brake 124 is open, gearset 114 is not grounded. Brake 122 is closed, grounding gearset 112, in particular, carrier 138 and ring 162 and torque is transmitted from shaft 116 through sun 158 and carrier 174 to output 118. For second gear, brake 122 is opened, switch 156 selects position 170, and switch 136 selects position 150. Since brake 122 opens, gearset 122 becomes ungrounded. Brake 124 is closed, grounding gearset 114, in particular, carrier 146 and ring 168 and torque is transmitted from shaft 116 through sun 166 to carrier 176 and output 118. To shift to third gear, switch 154 selects position 160, switch 134 selects position 144, and brake 124 is opened. Brake 122 is closed, grounding gearset 112, in particular, sun 142 and torque is transmitted from shaft 116 through sun 158 and gearset 126 to gearset 128 and ring 178 to output 118.

Thus, the configurations for gears in the transmission as shown are as follows:

First gear: brake 122 closed, brake 124 open, switch 134=140, and switch 154=160.

Second gear: brake 122 open, brake 124 closed, switch 136=150, and switch 156=170.

Third gear: brake 122 closed, brake 124 open, switch 134=144, and switch 154=160.

Fourth gear: brake 122 open, brake 124 closed, switch 136=152, and switch 156=170.

Fifth gear: brake 122 closed, brake 124 open, switch 134=144, and switch 154=164.

Sixth gear: brake 122 open, brake 124 closed, switch 136=152, and switch 156=172.

Reverse gear: brake 122 open, brake 124 closed, switch 136=150, and switch 156=179.

It should be understood that other configurations of the brakes, switches, and gearsets are within the spirit and scope of the claimed invention.

Figure 3:
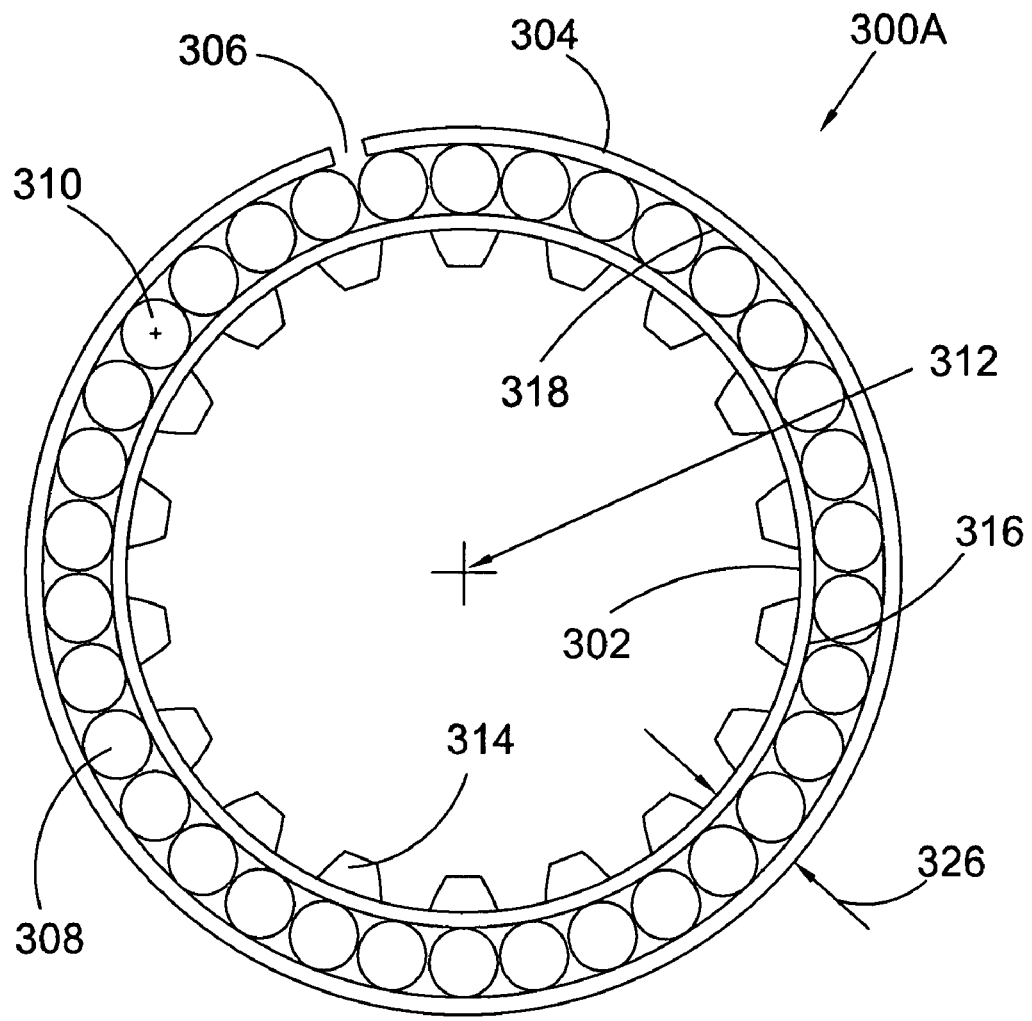
FIG. 3 is a cross-sectional view of a present invention radially expanding switchable one-way clutch.

FIG. 3 is a cross-sectional view of present invention radially expanding switchable one-way clutch 300A.

Figure 4A:
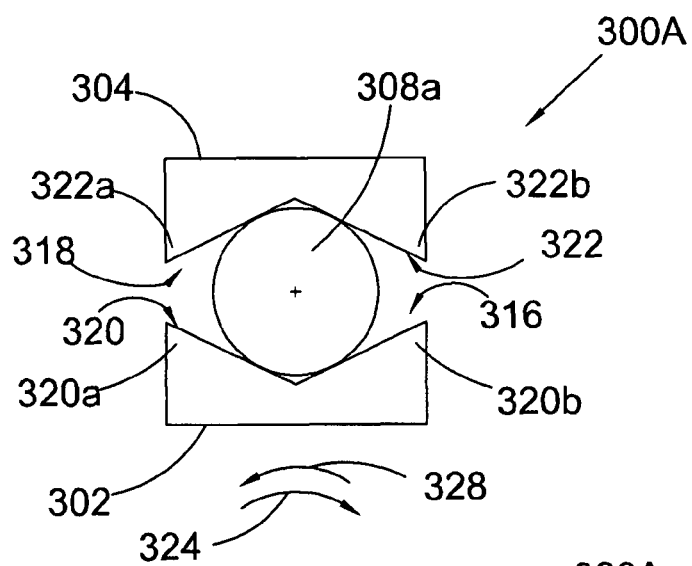
FIG. 4A is a detail of the clutch shown in FIG. 3 in torsional isolation mode.

FIG. 4A is a detail of clutch 300A shown in FIG. 3 in torsional isolation mode.

Figure 4B:
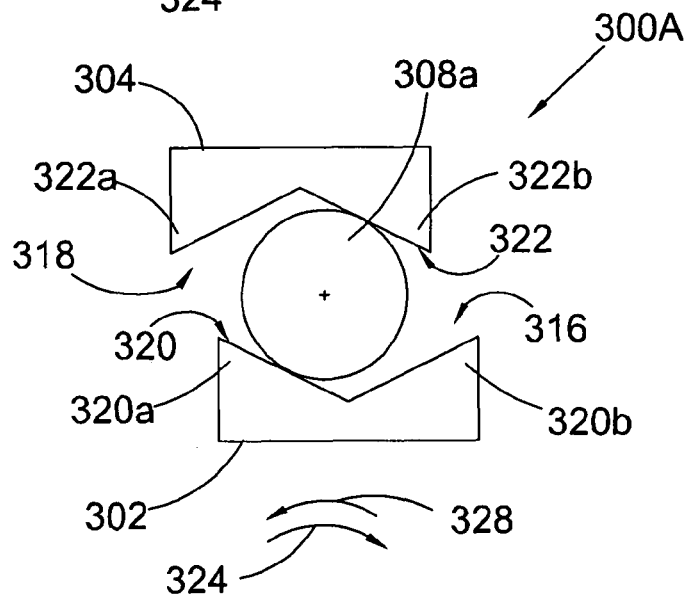
FIG. 4B is a detail of the clutch shown in FIG. 3 in locking mode.

FIG. 4B is a detail of clutch 300A shown in FIG. 3 in locking mode. The following should be viewed in light of FIGS. 3 through 4B. FIGS. 3 through 4B are shown without cross-hatching to clarify the presentation. A present invention one-way clutch includes inner and outer rings. One of the inner or outer rings is arranged to radially displace to rotationally lock with the other of the inner or outer rings. Clutch 300A includes inner ring 302 and radially displaceable outer ring 304. Ring 304 is arranged to radially expand in response to hydraulic pressure. The radial expansion enables a switch between a torque isolation, or torsional isolation, mode and a locked mode. In some aspects, ring 304 includes circumferential opening 306 to enable the radial expansion. That is, ring 304 is split. In some aspects, clutch 300A includes rollers 308 located between the rings. Axes of rotation 310 for the rollers are aligned with longitudinal axis 312 for the clutch. In general, ring 302 is arranged to rotationally connect to a torque transmitting device, for example, an input shaft (not shown). By rotationally connected, or secured, we mean that the ring and the device are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra. In some aspects, splines 314 are used to connect ring 302 and the torque transmitting device. However it should be understood that any means known in the art can be used to rotationally connect a present invention clutch to a torque transmitting device, element, or component.

In general, ring 304 is arranged to engage a torque receiving element, for example, a planetary gearset. Prior to the radial expansion of ring 304, in the torsional isolation mode, ring 304 slidingly engages the receiving element. That is, the ring and element are in contact, but the ring slides along the surface of the receiving element without rotationally locking with the element. Thus, the torque receiving element is torsionally isolated from the torque transmitting element. That is, torque is not transmitted from the torque transmitting element to the torque receiving element via the clutch, specifically rings 302 and 304. The torque receiving element can be rotationally stationary, or can be rotating, in which case the torque receiving element is free wheeling with respect to the torque transmitting element. After the radial expansion, ring 304 rotationally connects to the receiving element. That is, the frictional force between the ring and the receiving element is sufficient to rotationally lock the ring and element. Then, the clutch transmits torque from the torque transmitting element to the torque receiving element.

Outer circumferential surface 316 of ring 302 and inner circumferential surface 318 of ring 304 are configured so that a differential rotation of rings 302 and 304 causes rollers 308 to displace along the configured surfaces to rotationally lock the rings. In some aspects, surfaces 316 and 318 are configured to form ramps 320 and 322, respectively. Rollers 308 are disposed between adjacent ramps, for example, roller 308a is disposed between ramps 320a and 320b of ring 302 and ramps 322a and 322b of ring 304. In the torsional isolation mode, rotational torque is transferred from ring 302 through rollers 308 to ring 304. Since ring 304 is sliding across but not gripping the torque receiving element, rings 302 and 304 rotate in the same direction, for example, direction 324 and at the same speed, that is, there is no differential rotation between the rings, and the rollers remained centered between adjacent ramps. In the torsional isolation mode, radial distance 326 between the rings is minimized.

As hydraulic pressure is applied to clutch 300A, ring 304 expands radially, increasing the drag torque between ring 304 and the torque receiving element. When the drag torque is greater than the forces holding the rollers in the torsional isolation position noted above, ring 304 begins to rotate slower than ring 302, that is, there is a differential rotation between the rings. Alternately stated, the radial expansion of ring 304 is arranged to enable a differential rotation between the inner and outer rings. In response to the radial expansion, the rollers are arranged to displace to rotationally lock the inner and outer rings as shown in FIG. 4B. That is, the rollers climb the ramps, for example, ramps 320a and 322b, further forcing rings 302 and 304 radially apart and causing or at least abetting the rotational connection of ring 304 and the torque receiving element. Thus, the rollers displace in response to the differential rotation.

Figure 4C:
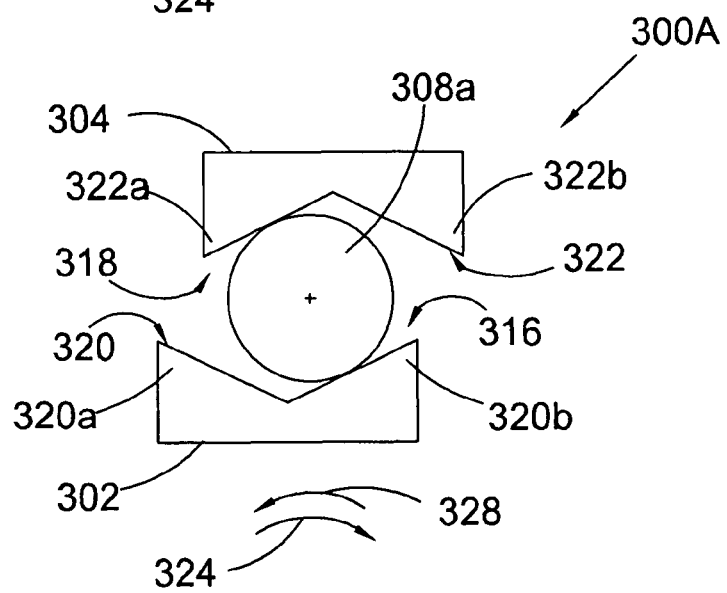
FIG. 4C is a detail of the clutch shown in FIG. 3 in locking mode in a direction opposite that for FIG. 4B.

FIG. 4C is a detail of clutch 300A shown in FIG. 3 in locking mode in a direction opposite that for FIG. 4B. The following should be viewed in light of FIGS. 3 through 4C. In some aspects, outer circumferential surface 316 of ring 302 and inner circumferential surface 318 of ring 304 also are configured so that clutch 300A is bi-directional, that is, the clutch can operate in torsional isolation and lock modes in direction 328 as well as direction 324. In some aspects, ramps 320 and 322 enable bi-directionality. Prior to expanding ring 304, ring 302 can rotate in direction 324 or 328 and the sliding engagement of ring 304 with a torque receiving element enables rollers 308 to remain in the position shown in FIG. 4A. In FIG. 4C, ring 304 has been radially expanded causing a differential rotation between the rings, as described for FIG. 4B. However, in response to the radial expansion and the differential rotation, the rollers climb a different set of the ramps than those climbed in FIG. 4B, specifically, ramps 320b and 322a, further forcing rings 302 and 304 radially apart and causing or at least abetting the rotational connection of ring 304 and the torque receiving element in direction 328.

Thus, clutch 300A can torsionally isolate in direction 324 or 328 and can lock in direction 324 or 328 or can operate in any combination of torsional isolation and locking with respect to directions 324 and 328 depending on the configuration of surfaces 316 and 318, the resistance offered by the torque receiving element, and the application of hydraulic pressure to the clutch. Further, all these variations are enabled by a same configuration of the clutch, for example, the configuration shown in FIGS. 3 through 4C, and the same pressurizing circuit, without the use of additional mechanical components or complexity.

Clutch 300A can be returned to the torsional isolation mode from the locking mode by removing the hydraulic pressure and decreasing the resistance of the receiving element, for example, by removing the receiving element from a torque transmitting path. Hydraulic pressure can be applied by any means known in the art (not shown), for example, fluid supplied by a pump to a rotating spool valve and guiding tube in a shaft.

Figure 5:
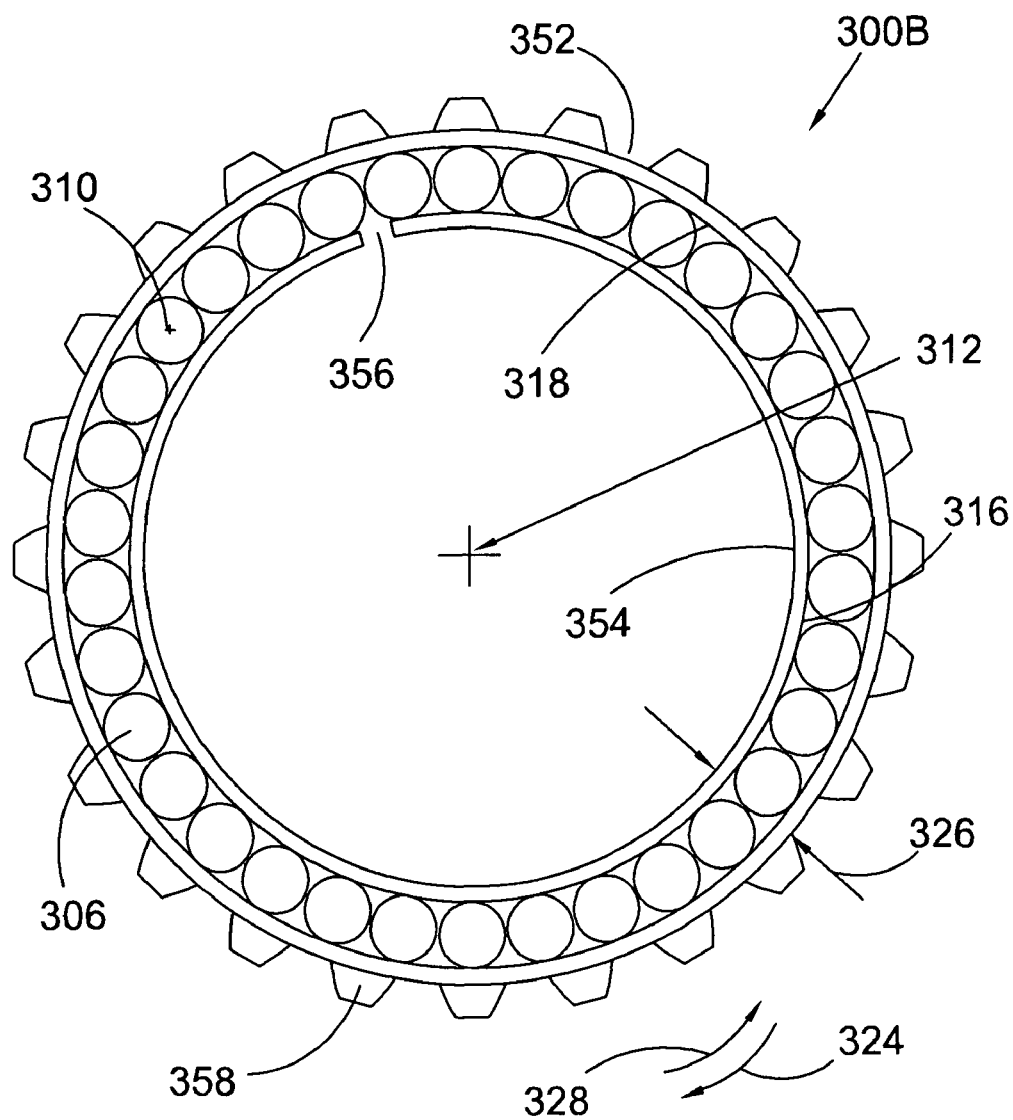
FIG. 5 is a cross-sectional view of a present invention radially contracting switchable one-way clutch.

FIG. 5 is a cross-sectional view of present invention switchable one-way clutch 300B. The following should be viewed in light of FIGS. 3 through 5. Clutch 300B includes outer ring 352 and radially displaceable inner ring 354. Ring 354 is arranged to radially contract in response to hydraulic pressure. The radial contraction enables a switch between a torsional isolation mode and a locked mode. In some aspects, ring 354 includes circumferential opening 356 to enable the radial contraction. That is, ring 354 is split. The discussion above regarding rollers 308 and axes 310 and 312 is applicable to clutch 300B. In general, ring 352 is arranged to rotationally connect to a torque transmitting device (not shown). In some aspects, splines 358 are used to connect ring 352 and the torque transmitting device.

In general, ring 352 is arranged to engage a torque receiving element (not shown). Prior to the radial contraction of ring 354, in the torsional isolation mode, ring 354 slidingly engages the receiving element. That is, the ring and element are in contact, but the ring slides along the surface of the receiving element without rotationally locking with the element. After the radial contraction, ring 354 rotationally connects to the receiving element. That is, the frictional force between the ring and the receiving element is sufficient to rotationally lock the ring and element.

The discussion in the descriptions of FIGS. 3 through 4C regarding circumferential surface 316 and 318, differential rotation of rings 302 and 304 and rollers 308, surfaces 316 and 318, and ramps 320 and 322 is applicable to rings 352 and 354 and clutch 300B. The discussion regarding torsional isolation and torque transmission for clutch 300A also is applicable to clutch 300B. For example, the torsional isolation and locking modes shown in FIGS. 4A through 4C are applicable to clutch 300B. Thus, clutch 300B can operate in the torsional isolation mode in direction 324 or 328 and can lock in direction 324 or 328 or can operate in any combination of isolation and locking with respect to directions 324 and 328 depending on the configuration of surfaces 316 and 318, the resistance offered by the torque receiving element, and the application of hydraulic pressure to the clutch. Further, all these variations are enabled by a same configuration of the clutch, for example, the configuration shown in FIG. 5, and the same pressurizing circuit, without the use of additional mechanical components or complexity.

Clutch 300B can be returned to the torsional isolation mode from the locking mode by removing the hydraulic pressure and decreasing the resistance of the receiving element, for example, by removing the receiving element from a torque transmitting path. Hydraulic pressure can be applied by any means known in the art (not shown).

Figure 6:
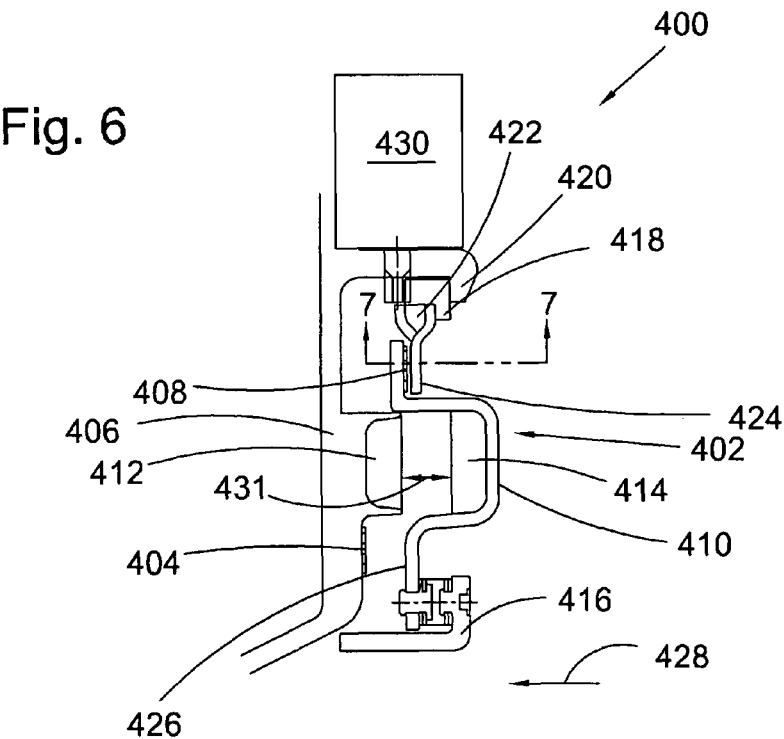
FIG. 6 is a partial cross-sectional view of a present invention fluid coupling brake.

FIG. 6 is a partial cross-sectional view of present invention fluid coupling brake 400.

Figure 7:
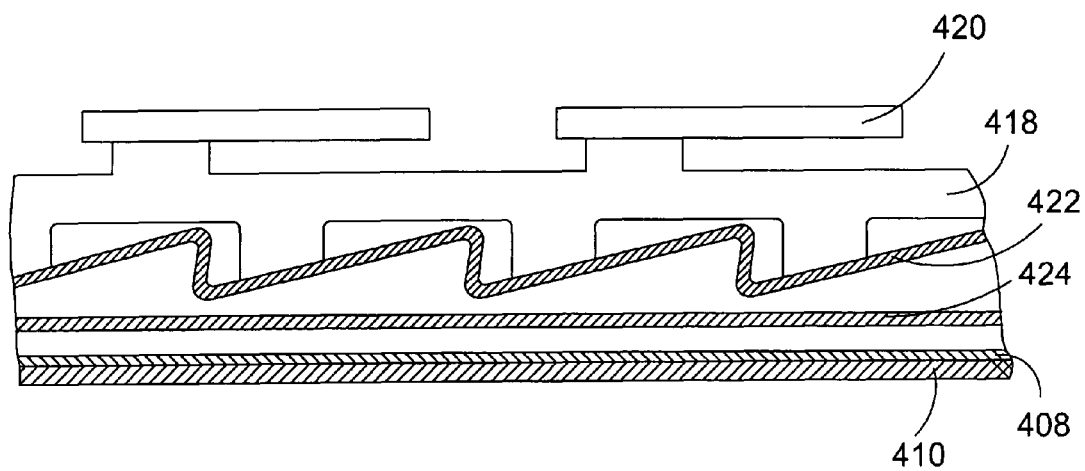
FIG. 7 is a cross-sectional view generally along line 7-7 in FIG. 6.

FIG. 7 is a partial cross-sectional view of brake 400 generally along line 7-7 in FIG. 6. The following should be viewed in light of FIGS. 6 and 7. Brake 400 includes fluid coupling 402 and friction material 404 fixedly connected to housing, or case, 406. In some aspects, brake 400 includes frictional material 408 fixedly secured to housing 410. Friction material 408 can be added to increase the torque capacity of brake 400. Blades 412 of the coupling are attached to, or integral to, case 406 and blades 414 are attached to, or integral to, housing 410. In some aspects, all or portions of the fluid coupling are stamped. Coupling 402 is connected to the components to be grounded via sleeve 416. Brake 400 also includes ramp ring 418 disposed between casing 406, for example, rim 420, and ramps 422 on clamping ring 424.

In an open position, for example, as shown in FIGS. 6 and 7, the pressure plate is rotated up the ramps away from the case. The fluid coupling is therefore opened. In this position, the fluid coupling blades create no torque and the frictional materials are not engaged. For example, material 404 is not in contact with section 426 of housing 410. Thus, sleeve 416 is rotationally disconnected from case 406.

To close the brake, the ramp ring is rotated down the ramps on the clamping ring, causing the ring to move in direction 428, toward case 406. The ring can be rotated by any means known in the art, for example, electric motor 430. The clamping ring is prevented from rotating by a spline connection to the housing (not shown). The movement of the ring causes housing 410 and blades 414 to also move in direction 428, initiating the fluid coupling of blades 412 and 414 and causing coupling 402 to begin to transmit torque from sleeve 416. That is, the coupling carries torque through the kinetic energy of the fluid (not shown) which is pushed from one half of the coupling to the other, for example by blades 414 to blades 412. Further, the torque transmitted by brake 400 is controlled by axial gap 431 in the coupling.

The fluid transfer creates an axial force proportional to fluid coupling torque. The axial force facilitates a frictional torque between friction lining 408 and matching part 424. That is, the fluid coupling provides the clamping force for friction material 408. Thus, brake 400 carries a mixture of fluid coupling torque and friction torque during braking engagement. Motor 430 continues to rotate the ramp ring until friction material 404 contacts portion 426, by-passing coupling 402. The fluid coupling can be fed by any means known in the art, for example, pumps already used in the device in which the coupling is disposed. In some aspects, low pressure flows of approximately 5 liters per minute (lpm) are adequate.

Figure 8:
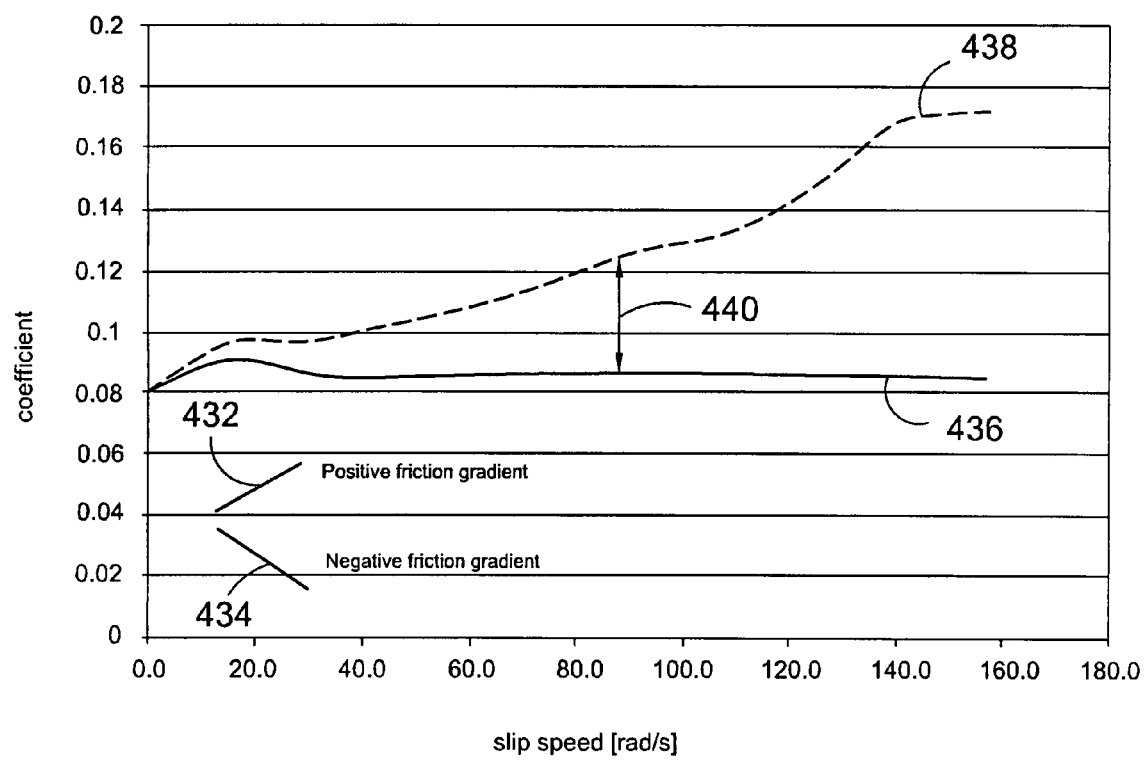
FIG. 8 is a graph showing frictional coefficient versus slip speed for a present invention fluid coupling brake.

FIG. 8 is a graph showing frictional coefficient versus slip speed for a present invention brake. The following should be viewed in light of FIGS. 6 through 8. As noted supra, as the fluid, or oil, in a wet clutch system degrades, the friction gradient goes negative and the clutch shudders during closing. Line 432 shows a positive friction gradient and line 434 shows a negative friction gradient. Line 436 shows a wet clutch alone using degraded oil and line 438 shows the improved gradient created by the same clutch represented by line 436 combined with a fluid coupling, for example, as shown in brake 400. Brake 400 minimizes, if not eliminates, the shudder by creating an effective friction characteristic with a positive gradient. In essence, the fluid coupling carries difference 440 between lines 436 and 438.

The fluid coupling has a very positive gradient of torque over slip speed. This gradient counteracts the negative friction gradient shown in line 436, even for severely degraded oil. Thus, brake 400 greatly extends the service life of the oil. Also, the coupling carries the majority of the torque during the launch event, providing a smoother launch and enhanced low speed maneuverability. Brake 400 also enables the use of electro-mechanical actuation, advantageously eliminating the need for high pressure fluid pumps, for example, as required for a wet launch clutch.

Figure 9A:
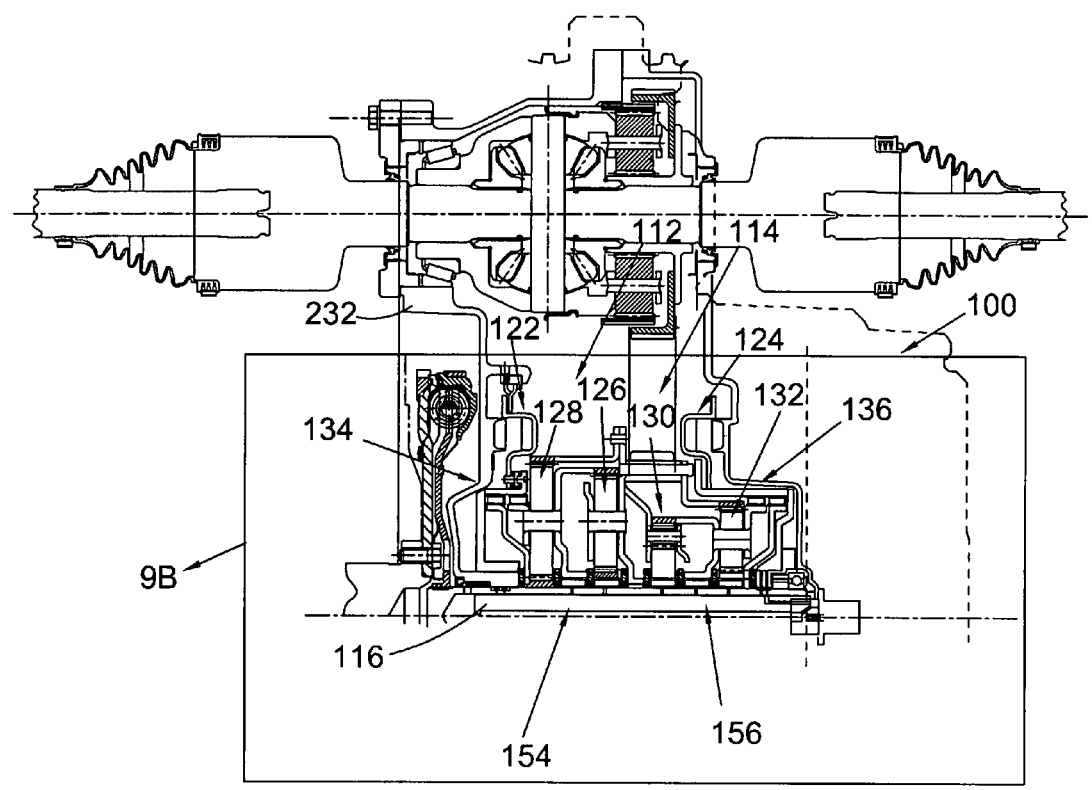
FIG. 9A is a partial cross-sectional view of the transmission shown in FIG. 2 with present invention one-way clutches and present invention fluid coupling brakes; and, FIG. 9B is a cross-sectional view of area 9B in FIG. 9A.

FIG. 9A is a partial cross-sectional view of the transmission shown in FIG. 2 with present invention one-way clutches and present invention fluid coupling brakes.

Figure 9B:
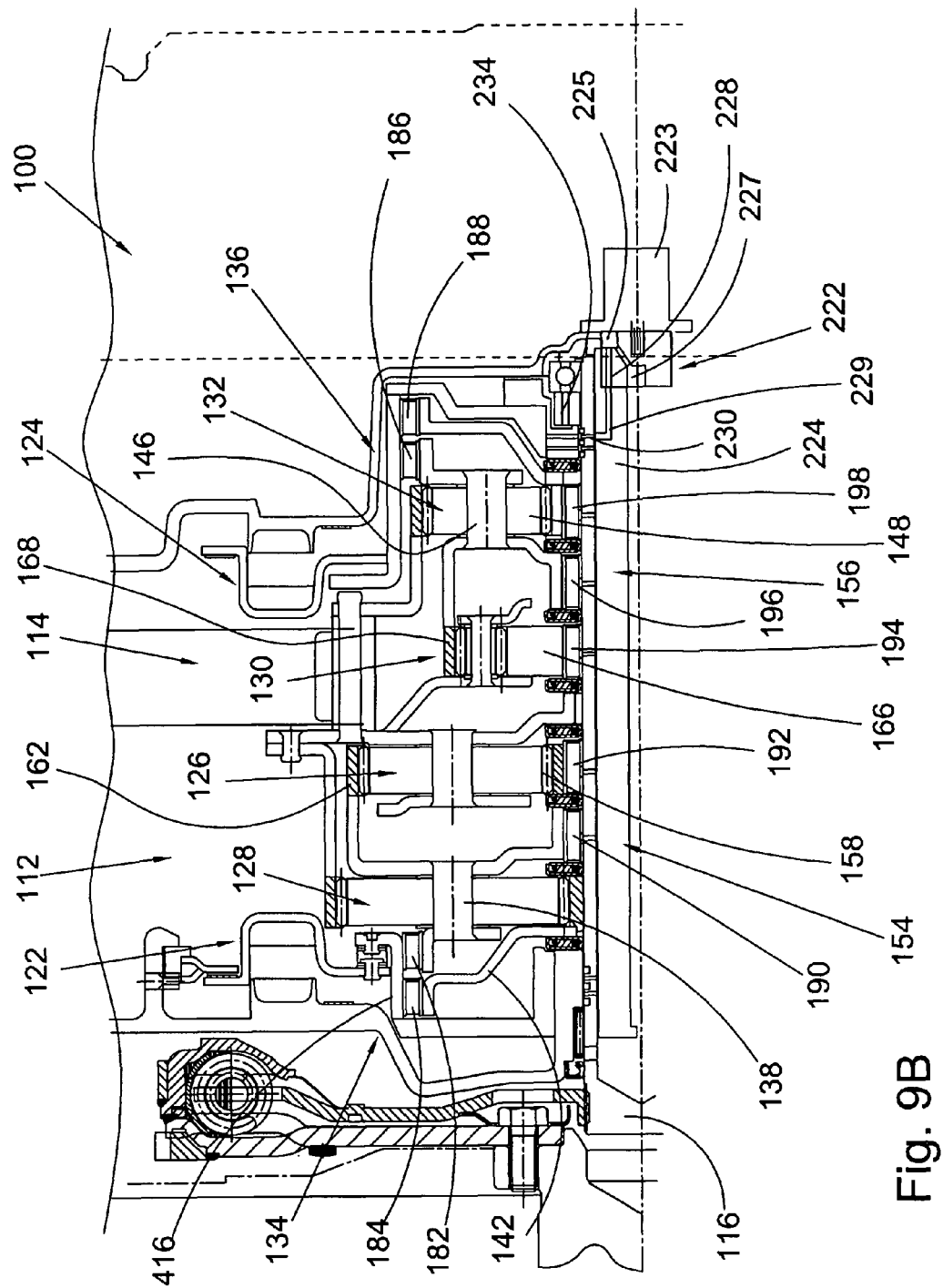

FIG. 9B is a cross-sectional view of area 9B in FIG. 9A. The following should be viewed in light of FIGS. 2 through 9B. In some aspects, some or all of switches 134, 136, 154, and 156 include one-way clutches, in particular clutches 300A or 300B. For example, switch 134 includes clutches 182 and 184, switch 136 includes clutches 186 and 188, switch 154 includes clutches 190 and 192, and switch 156 includes clutches 194, 196, and 198. In FIGS. 9A and 9B all of the one-way clutches noted above are present invention clutches as described in FIGS. 3 through 4C. However, it should be understood that other clutches or combinations of present invention one-way clutches are possible. For example, only a portion of the one-way clutches shown in FIGS. 9A and 9B could be clutches 300A or 300B.

Hydraulic pressure can be applied to the clutches in a transmission by any means known in the art, for example, in FIGS. 9A and 9B, rotating spool valve 222, operated by electric motor 223, feeds fluid to guiding tube 224, which is rotationally fixed. Fluid enters valve 222 through opening 225 about the outside perimeter of the valve. A portion of the fluid flows to tube 224 through passageway 227 and fills brakes 122 and 124 through radial holes in shaft 116. The remaining fluid flows into a series of passages 228 disposed axially through valve 222 and abutting tube 224. Only one such passage 228 is shown. Tube 224 is rotationally fixed (locked to housing 232). Tube 224 includes a plurality of axial passageways for respective gear combinations, the passageways aligned with respective radial openings in shaft 116. The openings connect the passageways to switches. Only one such passageway in tube 224 is shown. For example, passage 229 connects opening 230 for clutch 188 (the channel connecting opening 230 to clutch 188 is not fully shown). Pump 234 supplies the fluid with a constant fluid flow, for example at a pressure of 1-2 bar and 5 lpm.

In FIGS. 9A and 9B, the respective outer rings for clutches 190 and 192 in switch 154 are engaged with ring 162 and sun 158, respectively. The inner rings for the clutches are rotationally engaged with the input shaft. In position 160, fluid is fed into clutch 192, radially expanding the outer ring, causing the clutch to lock and transmit torque from the shaft to the sun. Hydraulic pressure is not introduced into clutch 190 and the clutch operates in the torsional isolation mode, that is, no torque is transmitted from shaft 116 to the ring. The remaining switches and clutches work in a similar manner. Thus, in some aspects, the switches in transmission 100 are a combination of respective clutches 300A/B and the means for controlling fluid fed to the clutches.

In some aspects, one or more of the brakes in transmission 100 are present invention brakes 400. In FIGS. 9A and 9B, brakes 122 and 124 are each a brake 400. For brake 122, flange 416 is connected to clutches 182 and 184, which are in turn connected to carrier 138 and sun 142, respectively. Thus, to operate transmission 100 in first gear, clutch 182 is pressurized and clutch 184 is depressurized so that carrier 138, which is rotating due to the coupling of gearset 128 with gearset 126, rotationally locks with flange 416. Then, as brake 122 is closed, flange 416 is rotationally locked with housing 232, grounding carrier 138 without shuddering.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

I claim:

1. A transmission for a vehicle, comprising:
   an input shaft;
   a first dual planetary gearset including first and second planetary gearsets and a first switch for connecting and disconnecting the first planetary gearset from the input shaft;
   a second dual planetary gearset including third and fourth planetary gearsets and a second switch for connecting and disconnecting the third planetary gearset from the input shaft;
   third and fourth switches; and,
   first and second brakes, wherein said first and second dual planetary gearsets are arranged to transmit torque, independent of each other, from the input shaft for said transmission to an output for said transmission, wherein said third switch is arranged to connect a sun for said second planetary gearset to said first brake in a first position and to connect a carrier for said second planetary gearset in a second position and wherein said fourth switch is arranged to connect a sun for said fourth planetary gearset to said second brake in a third position and to connect a carrier for said fourth planetary gearset in a fourth position.

2. The transmission of claim 1 wherein in a gear for said transmission, one of said first or second dual gearsets is arranged to transmit said torque to said output and the other of said first or second dual gearsets is arranged to be ungrounded.

3. The transmission of claim 1 wherein the first and second brakes are arranged to ground a respective portion of said first and second dual planetary gearsets, respectively.

4. The transmission of claim 3 wherein said second and fourth planetary gearsets are connected to said first and second brakes, respectively.

5. The transmission of claim 1 wherein said first and second switches further comprise at least one first and second clutch, respectively.

6. The transmission of claim 1 wherein in first and second positions for said first switch, a sun and a ring, respectively, for said first planetary gearset are arranged to connect to said input shaft and wherein in first and second positions for said second switch, a sun and a ring, respectively, for said third planetary gearset are arranged to connect to said input shaft.

7. The transmission of claim 6 further comprising at least one first and second one-way clutch, connected to the first and second switches, respectively.

8. A transmission for a vehicle, comprising:
   an input shaft;
   a first dual planetary gearset disconnectable from the input shaft and including a first carrier; and,
   a second dual planetary gearset disconnectable from the input shaft and including a second carrier, wherein said first and second dual planetary gearsets are each separately connected to a single output for said transmission, wherein the first dual planetary gearset includes first and second sun gears, wherein the second dual planetary gearset includes third and fourth sun gears, and wherein the first and second carriers are directly connected to the output.

9. A transmission for a vehicle, comprising:
first and second separate torque paths connected to a single output for said transmission;
first and second brakes connected to said first and second torque paths and arranged to switch torque from an input shaft for said transmission between said first and second torque paths; and,
first and second dual planetary gearsets disposed in said first and second torque paths, respectively, wherein:
the first brake is connectable and disconnectable to two separate components of the first dual planetary gearset;
the first brake is for grounding the two separate components of the first dual planetary gearset to a casing for the transmission;
the second brake is connectable and disconnectable to two separate components of the second dual planetary gearset; and,
the second brake is for grounding the two separate components of the second dual planetary gearset to the casing.

* * * * *